(12) United States Patent
Chao (10) Patent No.: US 10,091,207 B2
(45) Date of Patent: *Oct. 2, 2018

(54) SOCIAL NETWORK BASED MOBILE ACCESS

(71) Applicant: Facebook, Inc., Menlo Park, CA (US)

(72) Inventor: Alma G. Chao, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/992,741

(22) Filed: Jan. 11, 2016

(65) Prior Publication Data

US 2016/0119361 A1   Apr. 28, 2016

Related U.S. Application Data

(63) Continuation of application No. 13/747,098, filed on Jan. 22, 2013, now Pat. No. 9,264,412.

(51) Int. Cl.
*G06F 7/04* (2006.01)
*H04L 29/06* (2006.01)
*H04W 12/06* (2009.01)
*H04W 12/08* (2009.01)
*H04W 4/21* (2018.01)

(52) U.S. Cl.
CPC ............ *H04L 63/102* (2013.01); *H04L 63/08* (2013.01); *H04W 4/21* (2018.02); *H04W 12/06* (2013.01); *H04W 12/08* (2013.01)

(58) Field of Classification Search
CPC ...................................................... H04L 63/10
USPC .................................................... 726/26–30
See application file for complete search history.

(56) References Cited

U.S. PATENT DOCUMENTS

| 8,683,569 | B1 | 3/2014 | Lam | |
|---|---|---|---|---|
| 8,893,007 | B2 * | 11/2014 | Vadde | G06F 9/54 709/225 |
| 2006/0031830 | A1 * | 2/2006 | Chu | G06F 21/10 717/174 |
| 2007/0111794 | A1 * | 5/2007 | Hogan | A63F 13/12 463/42 |

(Continued)

FOREIGN PATENT DOCUMENTS

WO   WO 2011138473   10/2011

OTHER PUBLICATIONS

Avancini et al., "Security testing of the communication among Android applications," Automation of Software Test (AST), 2013 8th International Workshop on Year: 2013, pp. 57-63.*

(Continued)

*Primary Examiner* — Roderick Tolentino
(74) *Attorney, Agent, or Firm* — Baker Botts L.L.P.

(57) ABSTRACT

In one embodiment, a method includes retrieving one or more access rules of a first user account of a plurality of accounts of a social network and storing the retrieved one or more access rules. The method also includes receiving a request from a first user to install a first application on a computing device, wherein the first user is associated with the first user account of the social network. The method further includes determining whether the first user is permitted to install the first application on the computing device based on the stored one or more access rules of the first user account of the social network.

14 Claims, 5 Drawing Sheets

(56) References Cited

U.S. PATENT DOCUMENTS

| | | | |
|---|---|---|---|
| 2007/0198421 A1* | 8/2007 | Muller | G06F 21/10 705/52 |
| 2008/0168437 A1* | 7/2008 | Chen | G06F 21/6218 717/176 |
| 2010/0319067 A1* | 12/2010 | Mohanty | G06F 21/6218 726/21 |
| 2011/0045811 A1 | 2/2011 | Kemery | |
| 2012/0060181 A1 | 3/2012 | Craner | |
| 2012/0110640 A1* | 5/2012 | Donelson | H04L 63/102 726/3 |
| 2012/0192258 A1* | 7/2012 | Spencer | H04W 12/06 726/7 |
| 2013/0024910 A1 | 1/2013 | Verma et al. | |
| 2013/0110776 A1 | 5/2013 | Nunez Diaz et al. | |
| 2013/0174223 A1 | 7/2013 | Dykeman et al. | |
| 2013/0217365 A1* | 8/2013 | Ramnani | H04L 67/306 455/414.1 |
| 2013/0227030 A1* | 8/2013 | Eidelson | H04L 67/1095 709/206 |
| 2014/0057606 A1 | 2/2014 | Kunjithapatham et al. | |
| 2014/0115693 A1* | 4/2014 | Schieman | G06F 21/53 726/17 |

OTHER PUBLICATIONS

Li et al., "Role Based Access Control for social network sites," Pervasive Computing (JCPC), 2009 Joint Conferences on Year: 2009 pp. 389-394.*

Sarah Perez, KIDO'Z Arrives On Mobile, Making Android Devices Safe for Kids, http://techcrunch.com/2012/10/10/kidoz-arrives-on-mobile-making-android-devices-safe-for-kids/, Downloaded Jul. 28, 2014.

Li et al., "Role Based Access Control for Social Network Sites," Pervasive Computing (JCPC) 2009 Joint Conferences on Year: 2009, pp. 389-394.

Alma G. Chao, U.S. Appl. No. 13/747,098, Non-Final Rejection, dated Jun. 25, 2014.

Alma G. Chao, U.S. Appl. No. 13/747,098, Final Rejection, dated Nov. 7, 2014.

Alma G. Chao, U.S. Appl. No. 13/747,098, Notice of Allowance, dated Sep. 28, 2015.

* cited by examiner

SOCIAL NETWORK BASED MOBILE ACCESS

RELATED APPLICATION

This application is a continuation under 35 U.S.C. § 120 of U.S. application Ser. No. 13/747,098, filed 22 Jan. 2013, and entitled "Social Network Based Mobile Access."

TECHNICAL FIELD

This disclosure generally relates to mobile access, and more particularly to accessing applications on a computing devices based on settings retrieved from a social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter is related to a method including retrieving and storing settings of a first user account of a plurality of accounts of a social network, receiving a request from a first user to access a first application on the computing device, the first user being associated with the first user account of the social graph, and determining whether the first user is permitted to access the first application on the computing device based on the one or more settings of the first user account of the social network.

For example, in particular embodiments, an application with access to a social network may be downloaded to and installed on a standard mobile device (e.g. smartphone or tablet computer). The installed application may then retrieve settings to apply to the mobile device. In some embodiments, the settings may include special access rules set by a parent for their underage children. The special access rules may allow controlled access to a subset of the communication capabilities and/or applications on the mobile device based on the special access rules from the social network. For example, the underage user may be limited to only sending SMS messages to friends on the social network within a pre-determined age range of the underage user, where the pre-determined range is set by the special access rules. As another example, the under-age user may be limited to making phone calls to friends on the social network within a particular user community specified by the adult. In some embodiments, the installed application may automatically synchronize permission access rules from the social network. For example, the special access rules may be periodically updated based on settings made by the adult, and the application may retrieve these updated settings accordingly.

The disclosed subject matter is also related to one or more computer-readable non-transitory storage media embodying software that is operable when executed to: retrieve and store settings of a first user account of a plurality of accounts of a social network, receive a request from a first user to access a first application on the computing device, the first user being associated with the first user account of the social graph, and determine whether the first user is permitted to access the first application on the computing device based on the one or more settings of the first user account of the social network.

The disclosed subject matter is further related to a system including one or more processors and a memory coupled to the processors. The memory includes instructions executable by the processors. The processors are operable when executing the instructions to: retrieve and store settings of a first user account of a plurality of accounts of a social network, receive a request from a first user to access a first application on the computing device, the first user being associated with the first user account of the social graph, and determine whether the first user is permitted to access the first application on the computing device based on the one or more settings of the first user account of the social network.

DESCRIPTION OF EXAMPLE EMBODIMENTS

Mobile communication devices present a number of challenges to parents with underage children. One challenge to parents is the difficulty in monitoring their underage children's usage of a mobile communication device. Without constant supervision, a parent may not be able to control a child's access to certain applications on the communication device. For instance, a parent may not wish for their child to make a call or send a message to an unknown person. This is especially important in the situation where a child has their own communication device independent from the parent's. Likewise, a parent may not wish for a child to have access to certain applications on a communication device. With current systems, however, access controls may not easily or efficiently implemented. For example, a parent may be able to include password protection for certain applications to control the child's access, but this may hinder the parent's own access to the application as they would be required to enter a password any time they wished to access a device function such as using the phone or sending a message. Other controls may also hinder proper use of the communication device.

Accordingly, one aspect of the present disclosure includes securing a mobile communication device (e.g. smartphone or tablet computer) based on settings from a social network. The settings from the social network may be retrieved and applied to the mobile device. For example, in some embodiments, an application with access to the social network (e.g., a third party application) may be downloaded to and installed on the mobile device. The settings may then be retrieved by the application and applied to the mobile device. In other embodiments, however, the operating system of the mobile device may have direct access to the settings from the social network and may be operable to retrieve the settings and apply them to the device without the use of an installed application.

The settings applied to the mobile device may include special access rules set by a parent for their underage children. The special access rules may allow controlled access to a subset of the communication capabilities and/or applications on the mobile device based on the special access rules from the social network. For example, the settings may allow the user to use a phone application on the mobile device while not allowing any SMS, MMS, email, or any other messaging applications on the device (e.g., by blocking access to the applications or by deleting the applications from the mobile device). Furthermore, the special access rules may also control access to a subset of a particular application's abilities as well. For example, the underage user may be limited to sending SMS messages only to friends on the social network within a pre-determined age range of the underage user, where the pre-determined range is set by the special access rules. As another example, the under-age user may be limited to making phone calls to friends on the social network within a particular user community specified by the adult. In some embodiments, the installed application may automatically synchronize permission access rules from the social network. For example, the special access rules may be periodically updated based on settings made by the adult, and the application may retrieve these updated settings accordingly.

Figure 1:
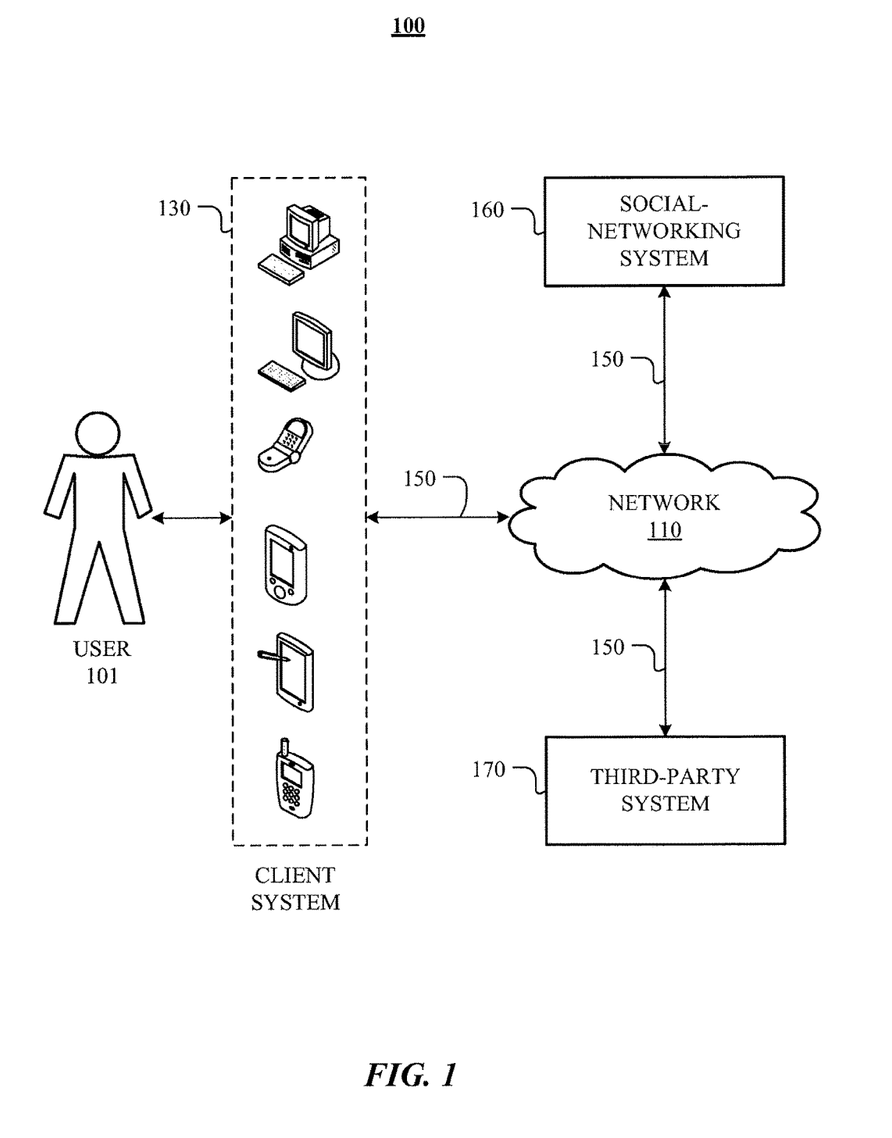
FIG. 1 illustrates an example network environment associated with a social-networking system in accordance with particular embodiments of the present disclosure.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g. an enterprise, business, or third-party application), or a group (e.g. of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g. third-party systems 170), such as, for example, by setting appropriate privacy settings.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
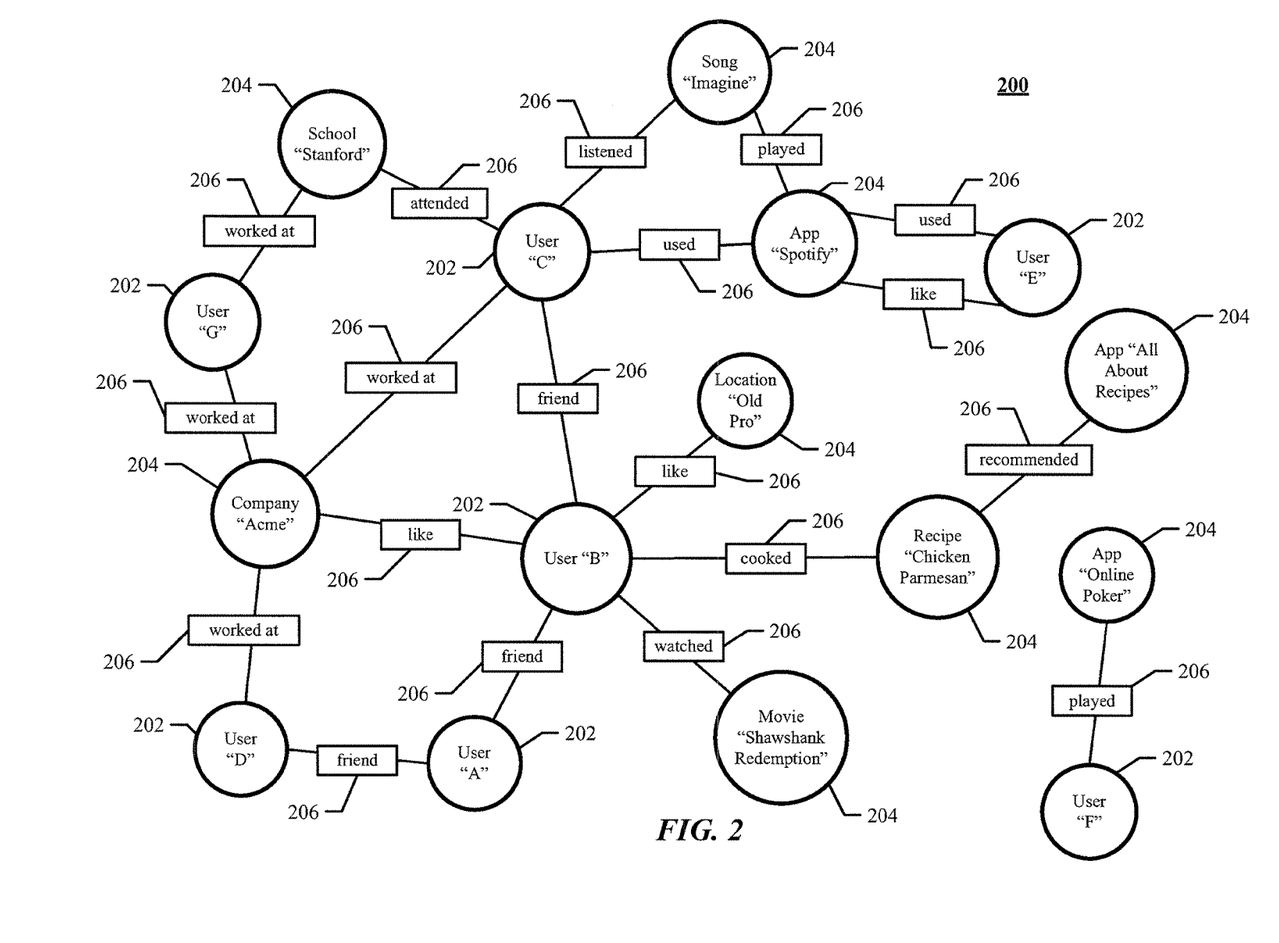
FIG. 2 illustrates an example social graph in accordance with particular embodiments of the present disclosure.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to send to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 3:
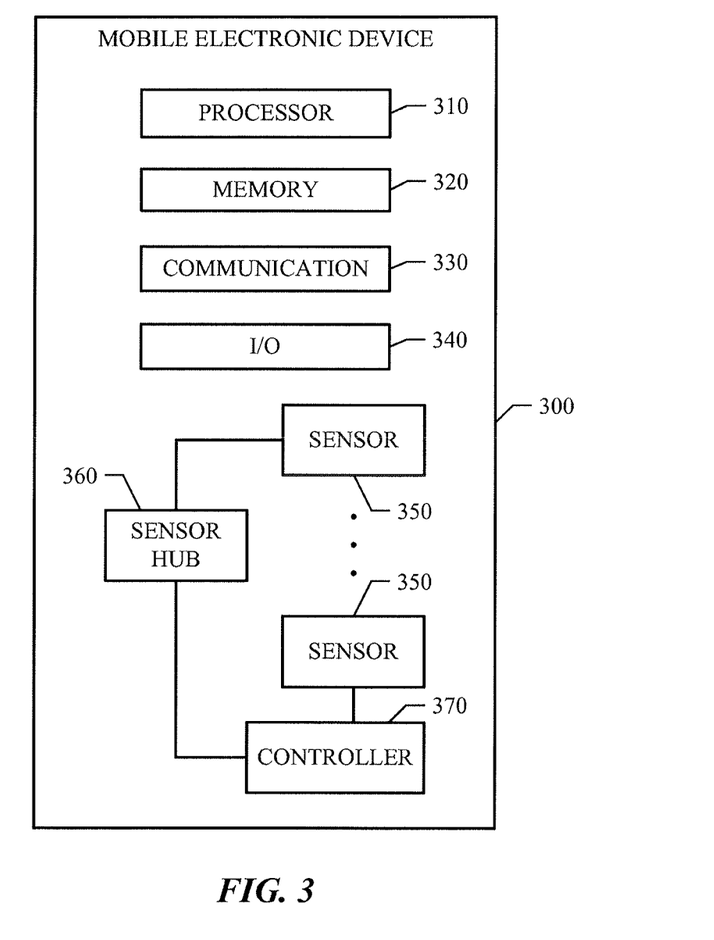
FIG. 3 illustrate an example personal computing device in accordance with particular embodiments of the present disclosure.

FIG. 3 illustrates an example personal computing device 300. In particular embodiments, personal computing device 300 may comprise a processor 310, a memory 320, a communication component 330 (e.g., antenna and communication interface for wireless communications), one or more input and/or output (I/O) components and/or interfaces 340, and one or more sensors 350. In particular embodiments, one or more I/O components and/or interfaces 340 may incorporate one or more sensors 350. In particular embodiments, personal computing device 300 may comprise a computer system or and element thereof as described in FIGS. 7-8 and their associated descriptions.

In particular embodiments, a personal computing device, such as a computing device, may include various types of sensors 350, such as, for example and without limitation: touch sensors (disposed, for example, on a display of the device, the back of the device and/or one or more lateral edges of the device) for detecting a user touching the surface of the mobile electronic device (e.g., using one or more fingers); accelerometer for detecting whether the personal computing device 300 is moving and the speed of the movement; thermometer for measuring the temperature change near the personal computing device 300; proximity sensor for detecting the proximity of the personal computing device 300 to another object (e.g., a hand, desk, or other object); light sensor for measuring the ambient light around the personal computing device 300; imaging sensor (e.g., camera) for capturing digital still images and/or video of objects near the personal computing device 300 (e.g., scenes, people, bar codes, QR codes, etc.); location sensors (e.g., Global Positioning System (GPS)) for determining the location (e.g., in terms of latitude and longitude) of the mobile electronic device; sensors for detecting communication networks within close proximity (e.g., near field communication (NFC), Bluetooth, RFID, infrared); chemical sensors; biometric sensors for biometrics-based (e.g., fingerprint, palm vein pattern, hand geometry, iris/retina, DNA, face, voice, olfactory, sweat) authentication of user of personal computing device 300; etc. This disclosure contemplates that a mobile electronic device may include any applicable type of sensor. Sensors may provide various types of sensor data, which may be analyzed to determine the user's intention with respect to the mobile electronic device at a given time.

In particular embodiments, a sensors hub 360 may optionally be included in personal computing device 300. Sensors 350 may be connected to sensors hub 360, which may be a low power-consuming processor that controls sensors 350, manages power for sensors 350, processes sensor inputs, aggregates sensor data, and performs certain sensor functions. In addition, in particular embodiments, some types of sensors 350 may be connected to a controller 370. In this case, sensors hub 360 may be connected to controller 370, which in turn is connected to sensor 350. Alternatively, in particular embodiments, there may be a sensor monitor in place of sensors hub 360 for managing sensors 350.

In particular embodiments, in addition to the front side, personal computing device 300 may have one or more sensors for performing biometric identification. Such sensors may be positioned on any surface of personal computing device 300. In example embodiments, as the user's hand touches personal computing device 300 to grab hold of it, the touch sensors may capture the user's fingerprints or palm vein pattern. In example embodiments, while a user is viewing the screen of personal computing device 300, a camera may capture an image of the user's face to perform facial recognition. In example embodiments, while a user is viewing the screen of personal computing device 300, an infrared scanner may scan the user's iris and/or retina. In example embodiments, while a user is in contact or close proximity with personal computing device 300, chemical and/or olfactory sensors may capture relevant data about a user. In particular embodiments, upon detecting that there is a change in state with respect to the identity of the user utilizing personal computing device 300, either by itself or in combination with other types of sensor indications, personal computing device 300 may determine that it is being shared.

In particular embodiments, in addition to the front side, the personal computing device 300 may have touch sensors on the left and right sides. Optionally, the personal computing device 300 may also have touch sensors on the back, top, or bottom side. Thus, as the user's hand touches personal computing device 300 to grab hold of it, the touch sensors may detect the user's fingers or palm touching personal computing device 300. In particular embodiments, upon detecting that there is a change in state with respect to a user touching personal computing device 300, either by itself or in combination with other types of sensor indications, personal computing device 300 may determine that it is being shared.

In particular embodiments, personal computing device 300 may have an accelerometer in addition to or instead of the touch sensors on the left and right sides. Sensor data provided by the accelerometer may also be used to estimate whether a new user has picked up personal computing device 300 from a resting position, e.g., on a table or desk, display shelf, or from someone's hand or from within someone's bag. When the user picks up personal computing device 300 and brings it in front of the user's face, there may be a relatively sudden increase in the movement speed of personal computing device 300. This change in the device's movement speed may be detected based on the sensor data supplied by the accelerometer. In particular embodiments, upon detecting that there is a significant increase in the speed of the device's movement, either by itself or in combination with other types of sensor indications, personal computing device 300 may determine that it is being shared.

In particular embodiments, personal computing device 300 may have a Gyrometer in addition or instead of the touch sensors on the left and right sides. A Gyrometer, also known as a gyroscope, is a device for measuring the orientation along one or more axis. In particular embodiments, a Gyrometer may be used to measure the orientation of personal computing device 300. When personal computing device 300 is stored on a shelf or in the user's bag, it may stay mostly in one orientation. However, when the user grabs hold of personal computing device 300 and lifts it up and/or moves it closer to bring it in front of the user's face, there may be a relatively sudden change in the orientation of personal computing device 300. The orientation of personal computing device 300 may be detected and measured by the Gyrometer. If the orientation of personal computing device 300 has changed significantly. In particular embodiments, upon detecting that there is a significant change in the orientation of personal computing device 300, either by itself or in combination with other types of sensor indications, personal computing device 300 may determine that it is being shared.

In particular embodiments, personal computing device 300 may have a light sensor. When personal computing device 300 is stored in a user's pocket or case, it is relatively dark around personal computing device 300. On the other hand, when the user brings personal computing device 300 out of his pocket, it may be relatively bright around personal computing device 300, especially during day time or in well-lit areas. The sensor data supplied by the light sensor may be analyzed to detect when a significant change in the ambient light level around personal computing device 300 occurs. In particular embodiments, upon detecting that there is a significant increase in the ambient light level around personal computing device 300, either by itself or in combination with other types of sensor indications, personal computing device 300 may determine that it is being shared.

In particular embodiments, personal computing device 300 may have a proximity sensor. The sensor data supplied by the proximity sensor may be analyzed to detect when personal computing device 300 is in close proximity to a specific object, such as the user's hand. For example, computing device 300 may have an infrared LED (light-emitting diode) 290 (i.e., proximity sensor) placed on its back side. When the user holds such a computing device in his hand, the palm of the user's hand may cover infrared LED 290. As a result, infrared LED 290 may detect when the user's hand is in close proximity to computing device 300. In particular embodiments, upon detecting that personal computing device 300 is in close proximity to the user's hand, either by itself or in combination with other types of sensor indications, personal computing device 300 may determine that it is being shared.

A personal computing device 300 may have any number of sensors of various types, and these sensors may supply different types of sensor data. Different combinations of the individual types of sensor data may be used together to detect and estimate a user's current intention with respect to personal computing device 300 (e.g., whether the user really means to take personal computing device 300 out of his pocket and use it). Sometimes, using multiple types of sensor data in combination may yield a more accurate, and thus better, estimation of the user's intention with respect to personal computing device 300 at a given time than only using a single type of sensor data. Nevertheless, it is possible to estimate the user's intention using a single type of sensor data (e.g., touch-sensor data).

Figure 4:
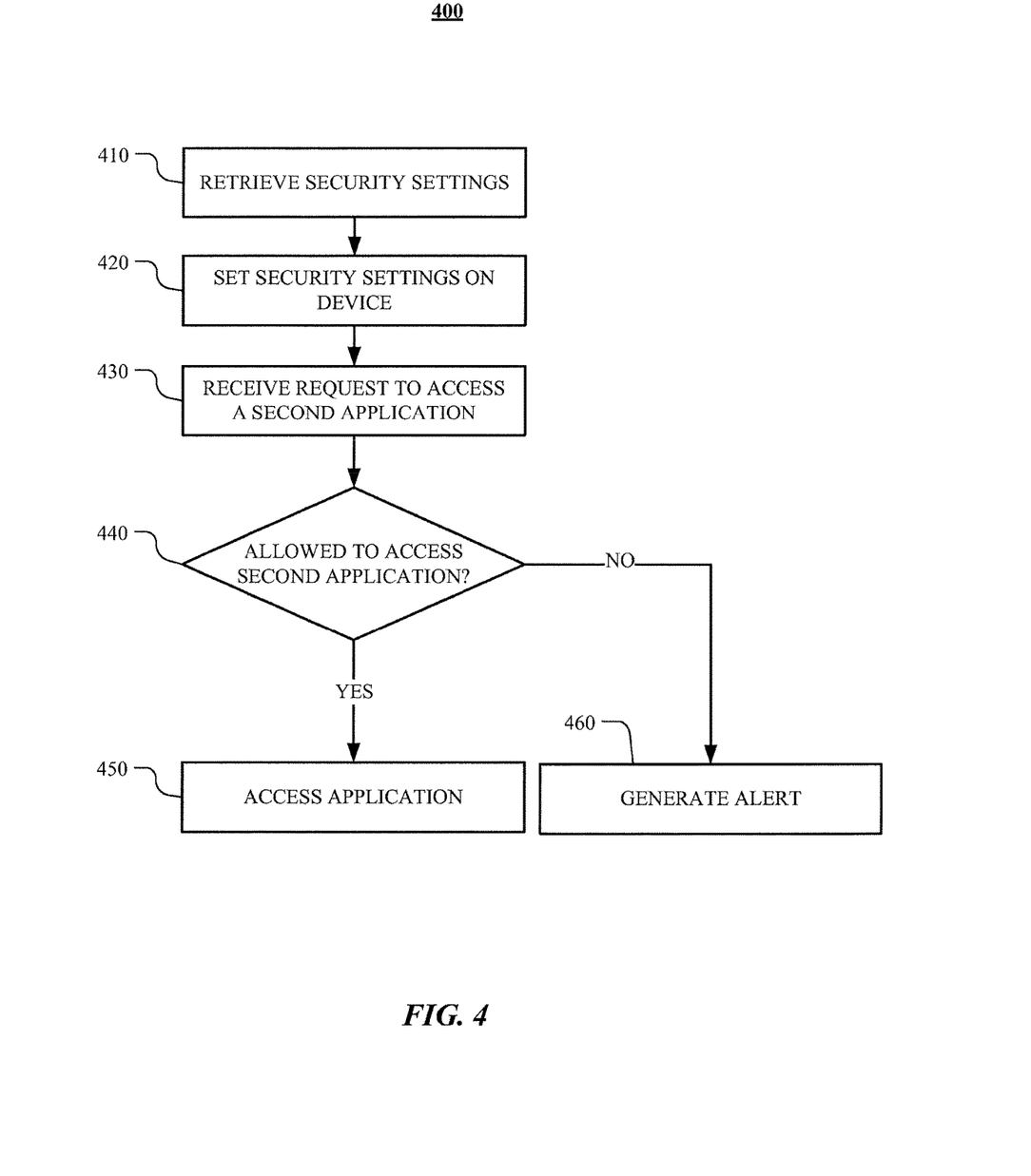
FIG. 4 illustrates an example method for securing access to an application on a personal computing device in accordance with particular embodiments of the present disclosure.

FIG. 4 illustrates an example method 400 for securing access to an application on a personal computing device. The method may begin at step 410, where a computing device retrieves security settings to apply to the computing device. In particular embodiments, the settings may be retrieved from a social network, such as FACEBOOK. The retrieved settings may be security, privacy, and/or communications settings associated with a user's profile on the social network. In certain embodiments, the settings may be associated with a first user of a social network, e.g., a child, but based on settings provided by a second user of the social network, e.g., the child's parent. For instance, the parent may be able to have oversight and control of the child's social network account, and may be able to set certain security, privacy, and/or access settings for the child's account.

In some embodiments, an application with access to the social network (e.g., a third party application) may be downloaded to and installed on the mobile device, and the settings may be retrieved through the installed application. The installed application may be associated with the social network and may allow the user to connect to the social network. In other embodiments, however, the operating system of the mobile device may have direct access to the settings from the social network and may be operable to retrieve the settings without the use of an installed application.

In some embodiments, the settings may be retrieved from the social network in response to a request originating from the computing device. The request may originate, in some embodiments, from an application installed on the device (e.g., an application associated with the social network). For example, a parent, after installing an application with access to the social network on their child's computing device, may initiate the application on the device and manually request that the settings be retrieved. As another example, the settings may be retrieved to the device automatically after a user enters their login information associated with the social network.

At step 420, the settings are set on the computing device. This may include storing the retrieved settings on the computing device. In some embodiments, the retrieved settings may be modified versions of original settings. For instance, a parent with control of their child's account may modify one or more of the security, privacy, or access settings on the social network associated with the child's account. In such instances, the installed application on the computing device may detect such modification of the settings and automatically retrieve and store the updated settings on the device. For instance, the application may be set to periodically check a social network account for updates. In some embodiments, access to the installed application may be restricted from the user of the device on which the application is installed. For example, a parent may wish for the child to not have access to the installed application so that the child may not change the settings retrieved and put in place by the parent.

At step 430, the computing device receives a request from a first user to access or initiate an application on the computing device. The application may include any application installed on the device. In some embodiments, the application may be a communication application such as a telephone, VoIP, video conferencing, SMS/MMS messaging, or email application. In such embodiments, the request to access the application may include a request to communicate with another user via the application (e.g. initiate a phone call or send an SMS message). In certain embodiments, the application may be a web browser or other suitable application for accessing a network such as the Internet. The request may be received through any suitable means, including touch input (e.g. tapping or clicking an application icon or key on the computing device) or voice input (e.g., a voice command to call a phone number).

At step 440, the computing device determines whether the first user is permitted to access the requested application on the computing device based on the settings associated with the first user node of the social graph. The settings may apply to any level of access or initiation of an application. For example, a user may not be permitted to access any portion of an application (e.g., may not be able to open a web browser). As another example, a user may be able to open the application, but may have restricted access to the application (e.g., may only send messages to certain recipients).

In some embodiments, settings related to communication applications may be related to the mode of communication requested. For example, the user may not be permitted to make phone calls, but may be able to send email messages. In some embodiments, settings related to communication applications may be based any suitable feature of an intended recipient. As one example, a user may be permitted to communicate only with others within a certain age range of his or herself. As another example, a user may be permitted to communicate with others that the user is associated with on a social network (e.g., "friends" on FACEBOOK). In some embodiments, the settings may be related to the time at which the application's use is requested. For example, the user may not be able to initiate an application after a certain time of night. Any suitable combination of the foregoing examples of settings may be used to achieve the intended user access permissions.

If it is determined at step 440 that the user is permitted to initiate the application as requested, the application is initiated and accessed at step 450. In some embodiments, this may include accessing all features of the application. For instance, where the retrieved settings allow, the user may be able to use the phone application of a device to call any phone number without restriction. In other embodiments, this may include restricted access to the application. For instance, the user may only be able to call certain phone numbers using the phone application based on the retrieved settings.

In the event that the user is not permitted to initiate the application, an alert is generated at step 460. For instance, in some embodiments, the alert may state to the user that he or she does not have access to the application. In other embodiments, an alert may be generated indicating that the user has attempted to access a restricted application. The alert may be of any suitable format, including but not limited to a pop-up message, an email message, an SMS message, or a phone call.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
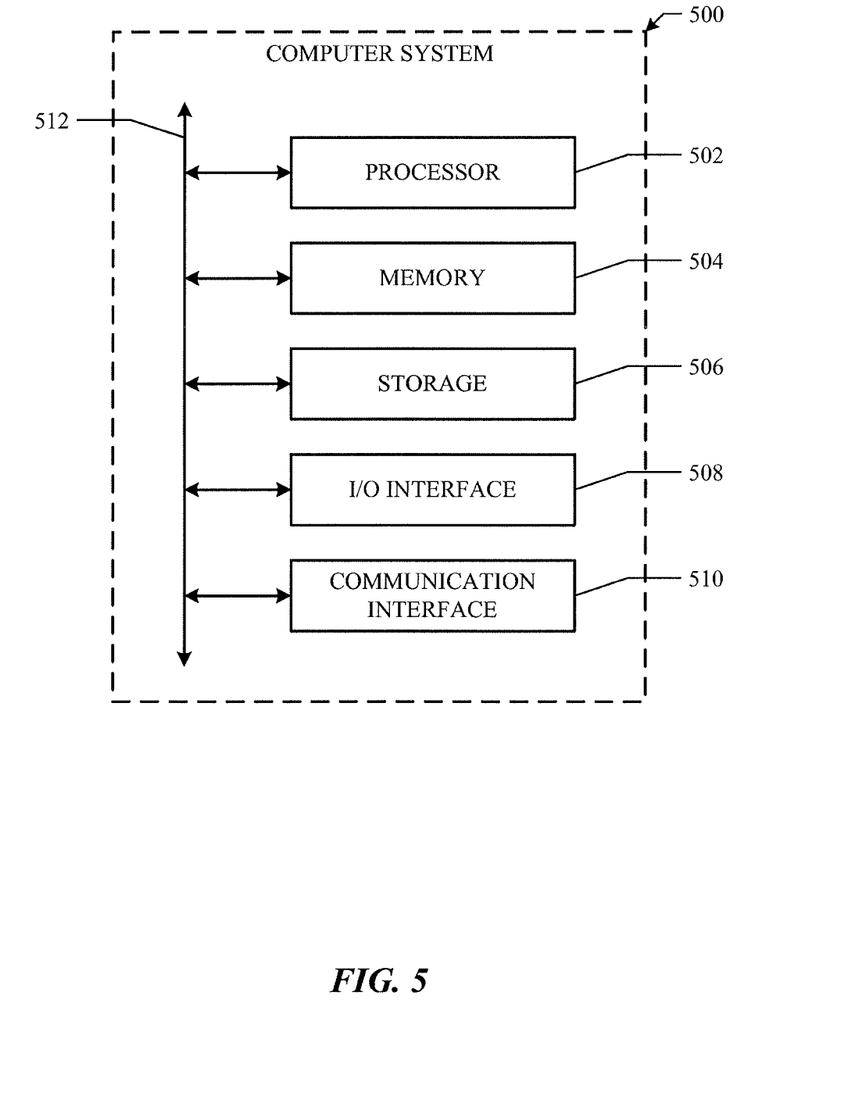
FIG. 5 illustrates an example computer system in accordance with particular embodiments of the present disclosure.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    by a client computing device, retrieving one or more access rules of a first user account of a plurality of accounts of a social network using a first application installed on the client computing device, the first application having access to the social network, wherein:
        the first user account is associated with a first user,
        the one or more access rules of the first user account are set on the social network using a second user account of the plurality of accounts, the second user account being associated with a second user,
        the second user is connected to the first user on the social network, and
        access to the first application on the client computing device is restricted from the first user to prevent changes to the one or more access rules by the first user;
    by the client computing device, storing the one or more access rules of the first user account using the first application in one or more data stores associated with the client computing device;
    by the client computing device, periodically checking an account of the social network for updates to the one or more access rules of the first user account;
    by the client computing device, receiving a request from the first user to install a second application on the client computing device;
    by the client computing device, determining whether the first user is permitted to install the second application on the client computing device by applying the one or more access rules of the first user account using the first application; and
    by the client computing device, generating an alert indicating that the first user has attempted to install the second application for display in association with the second user account.

2. The method of claim 1, wherein the first user is permitted to install the second application on the client computing device, the method further comprising:
    by the client computing device, determining that the first user is permitted to install the second application;
    by the client computing device, installing the second application;
    by the client computing device, receiving a request from the first user to initiate a first function of the second application; and
    by the client computing device, determining, based on the one or more access rules, whether the first user may initiate the first function of the second application.

3. The method of claim 1, further comprising, by the client computing device, deleting a third application installed on the client computing device based on the one or more access rules.

4. The method of claim 1, further comprising:
    by the client computing device, determining that the one or more access rules of the first user account have been modified;
    by the client computing device, retrieving the one or more modified access rules of the first user account; and
    by the client computing device, storing the one or more modified access rules.

5. The method of claim 1, further comprising:
    by the client computing device, determining that the first user is not permitted to install the second application; and
    by the client computing device, generating an alert indicating that the first user is not permitted to install the second application on the client computing device.

6. One or more computer-readable non-transitory storage media embodying software that is operable when executed to:
    retrieve one or more access rules of a first user account of a plurality of accounts of a social network using a first application installed on a client computing device, the first application having access to the social network, wherein:
        the first user account is associated with a first user,
        the one or more access rules of the first user account are set on the social network using a second user account of the plurality of accounts, the second user account being associated with a second user,
        the second user is connected to the first user on the social network, and access to the first application on the client computing device is restricted from the first user to prevent changes to the one or more access rules by the first user;

store the one or more access rules of the first user account using the first application in one or more data stores associated with the client computing device;

periodically check an account of the social network for updates to the one or more access rules of the first user account;

receive a request from the first user to install a second application on the client computing device;

determine whether the first user is permitted to install the second application on the client computing device by applying the one or more access rules of the first user account using the first application; and generate an alert indicating that the first user has attempted to install the second application for display in association with the second user account.

7. The media of claim 6, wherein the first user is permitted to install the second application on the client computing device, and the software is further operable when executed to:

determine that the first user is permitted to install the second application;

install the second application;

receive a request from the first user to initiate a first function of the second application; and determine, based on the one or more access rules, whether the first user may initiate the first function of the second application.

8. The media of claim 6, wherein the software is further operable when executed to delete a third application installed on the client computing device based on the one or more access rules.

9. The media of claim 6, wherein the software is further operable when executed to:

determine that the one or more access rules of the first user account have been modified;

retrieve the one or more modified access rules of the first user account; and store the one or more modified access rules.

10. The media of claim 6, wherein the software is further operable when executed to:

determine that the first user is not permitted to install the second application; and generate an alert indicating that the first user is not permitted to install the second application on the client computing device.

11. A system comprising: one or more processors; and a memory coupled to the processors comprising instructions executable by the processors, the processors being operable when executing the instructions to:

retrieve one or more access rules of a first user account of a plurality of accounts of a social network using a first application installed on a client computing device, the first application having access to the social network, wherein:

the first user account is associated with a first user, the one or more access rules of the first user account are set on the social network using a second user account of the plurality of accounts, the second user account being associated with a second user, the second user is connected to the first user on the social network, and access to the first application on the client computing device is restricted from the first user to prevent changes to the one or more access rules by the first user;

store the one or more access rules of the first user account using the first application in one or more data stores associated with the client computing device;

periodically check an account of the social network for updates to the one or more access rules of the first user account;

receive a request from the first user to install a second application on the client computing device;

determine whether the first user is permitted to install the second application on the client computing device by applying the one or more access rules of the first user account using the first application; and generate an alert indicating that the first user has attempted to install the second application for display in association with the second user account.

12. The system of claim 11, wherein the first user is permitted to install the second application on the client computing device, and the processors are further operable when executing the instructions to:

determine that the first user is permitted to install the second application;

install the second application;

receive a request from the first user to initiate a first function of the second application; and determine, based on the one or more access rules, whether the first user may initiate the first function of the second application.

13. The system of claim 11, wherein the processors are further operable when executing the instructions to delete a third application installed on the client computing device based on the one or more access rules.

14. The system of claim 11, wherein the processors are further operable when executing the instructions to:

determine that the one or more access rules of the first user account have been modified;

retrieve the one or more modified access rules of the first user account; and store the one or more modified access rules.

* * * * *